United States Patent

[11] 3,588,687

| [72] | Inventor | Hans W. Kohler<br>Washington, D.C. |
|---|---|---|
| [21] | Appl. No. | 877,730 |
| [22] | Filed | Nov. 18, 1969 |
| [45] | Patented | June 28, 1971 |
| [73] | Assignee | The United States of America as represented by the Secretary of the Army<br>Continuation-in-part of application Ser. No. 717,191, Mar. 29, 1968, now abandoned. |

[54] SENSING COIL ARRANGEMENT FOR A METAL DETECTOR
7 Claims, 5 Drawing Figs.

[52] U.S. Cl. .................................................. 324/41, 336/225
[51] Int. Cl. ........................................ G01r 33/00
[50] Field of Search .......................... 324/34, 40, 41, 3; 336/225, 227

[56] References Cited
UNITED STATES PATENTS
| 2,124,579 | 7/1938 | Knerr et al. | 324/40 |
| 2,451,596 | 10/1948 | Wheeler | 324/3 |
| 2,505,778 | 5/1950 | Linbach | 324/40 |

OTHER REFERENCES

J. W. Joyce; INDUCTION PROSPECTING FOR SHALLOW ORE DEPOSITS & SMALL METALLIC OBJECTS, Dept. of Interior Info. Circular; Oct. 1935; pp. 10— 12 & FIGS. 10 & 11.

*Primary Examiner*—Alfred E. Smith
*Attorneys*—Harry M. Saragovitz, Edward J. Kelly, Herbert Berl and J. D. Edgerton ABSTRACT: A sensing coil arrangement for a metal detector which has very small voltages induced between any two points of the sensing coil. The coil arrangement is insensitive to hand effects. The coil arrangement comprises a primary coil and a secondary coil which is decoupled from the primary coil and attached to an amplification and sensing device which interprets the signal from the secondary coil. Great flexibility exists in the number of secondary coils used and in the actual configuration and placement of the secondary coils. The coil arrangement gives high sensitivity to metal objects present in the forward hemisphere. The coils can be arranged so that the direction of the metal objects relative to the coils may be determined. Printed circuits may be used in place of multiturn loops of wire.

PATENTED JUN 28 1971

INVENTOR,
HANS W. KOHLER

BY
Harry M. Saragovitz
Edward J. Kelly
Herbert Berl
J. D. Edgerton
ATTORNEYS

PATENTED JUN28 1971 3,588,687

INVENTOR,
HANS W. KOHLER
BY
Harry M. Saragovitz
Edward J. Kelly
Herbert Berl
J. D. Edgerton
ATTORNEYS

SENSING COIL ARRANGEMENT FOR A METAL DETECTOR

CROSS REFERENCES TO RELATED APPLICATIONS

This application is a continuation-in-part of Ser. No. 717,191 filed Mar. 29, 1968, now abandoned.

RIGHTS OF GOVERNMENT

The invention described herein may be manufactured, used, and licensed by or for the United States Government for governmental purposes with the payment to me of any royalty thereon.

BACKGROUND OF THE INVENTION

Instruments now exist for the location of metals that are hidden underground or submerged in water and their users are mainly mineral prospectors, beachcombers and treasure hunters. The ideal metal detector should have high sensitivity to very small objects, deep penetration, and the ability to discriminate an object outline. No basic detector can possibly meet all three goals since each must emphasize one particular factor.

Most present electronic metal locators consist of a primary coil excited by high frequency AC and two secondary or sensing coils in which the induced voltage in one sensing coil is added in series opposition to the induced voltage in the other sensing coil. Under free space conditions the two equal but opposite voltages cancel out. When a metallic object enters the useful range of the primary field the resulting eddy currents produce a magnetic field which induces unequal voltages in the two sensing coils. Adding these two unequal and opposite voltage vectors produces the desired signal. This signal is, however, very small compared to the two induced voltage vectors. Under field conditions where shock, vibration and temperature changes occur, it is difficult to keep this voltage balance without making readjustments. Additionally, the relatively large induced voltage builds up from one end of each coil to the other, causing displacement currents to flow between turns and from coils to ground or shield.

It is therefore an object of this invention to provide a novel sensing coil arrangement where neutralization of the induced voltage in free space occurs directly in each turn of the coil and where any part of the coil has a very small voltage relative to any other part and to ground.

An additional object of the invention is to provide a sensing coil arrangement where the sensing coil is insensitive to hand effects and does not need to be shielded.

Still another object of the invention is to provide a sensing coil arrangement where the coil arrangement will have high sensitivity to metal objects located in any direction in the forward hemisphere.

Yet another object of the invention is to provide a sensing coil arrangement which is simple to design and inexpensive to construct.

SUMMARY OF THE INVENTION

Briefly in accordance with this invention, the primary coil is arranged in the usual manner and the sensing coil, which consists of many turns, is draped around a figure of revolution corresponding to that obtained by the imaginary rotation of one of the primary magnetic field lines about the axis of primary coil. Because the surface of such a figure of revolution represents a surface of constant rms magnetic flux and because every element of the sensing coil lies on this surface, it follows that the sum of the induced voltages around the sensing coil is equal to zero. The voltage to ground from any point along the sensing coil will be substantially zero under free space conditions. Should the magnetic field be disturbed by the presence of some object, the entire sensing coil would no longer lie on a surface of constant rms magnetic flux and a net voltage would be induced in the coil. This voltage is picked off at the terminals of the coil and constitutes the signal.

Directionality may be achieved by arranging two or more coils along the surface of revolution and comparing the relative strength of the voltage induced in each coil.

BRIEF DESCRIPTION OF THE DRAWINGS

The specific nature of the invention as well as other objects, aspects, uses, and advantages thereof will clearly appear from the following description and from the accompanying drawing in which.

DESCRIPTION OF THE PREFERRED EMBODIMENT

Figure 1:
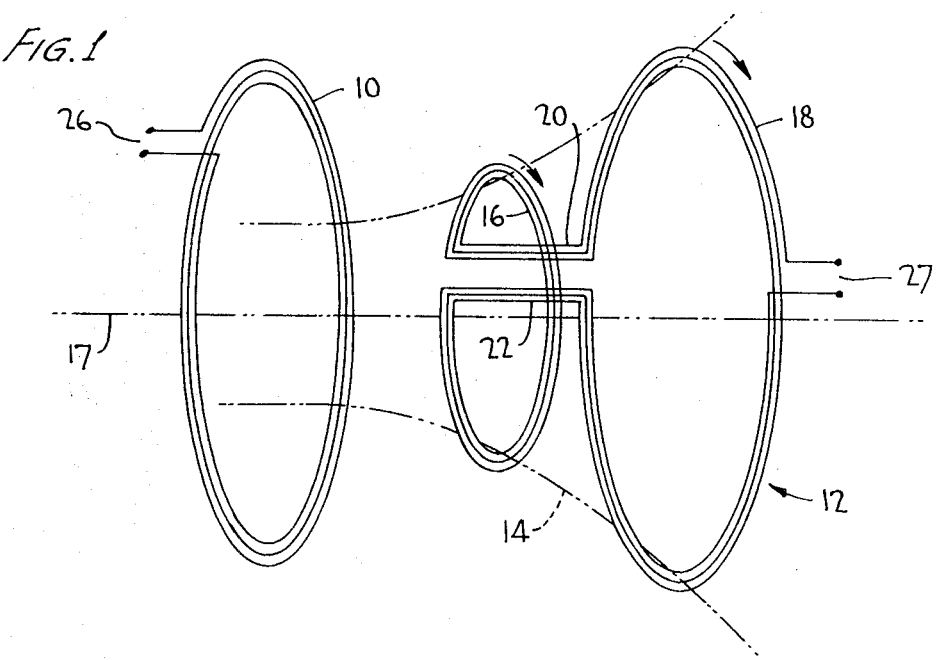
FIG. 1 is a perspective view of one embodiment of the invention.

FIG. 1 is a perspective view of the layout of the primary and the secondary coils in an embodiment of my invention. For ease of drawing the primary coil 10 and secondary coil 12 are shown as having only three turns. In actuality both coils have many turns and at some point 26 and 27 each coil is cut to connect a generator and amplifier, respectively. The primary coil 10 is circular having a central axis 17 and the secondary coil 12 consists of two nearly complete turns 16 and 18 of unequal diameter, coaxial with the primary 10, and of two cross connections 20 and 22 connecting the circles 16 and 18. As shown in FIG. 1, each turn of coil 12 traverses each of the arcs 16 and 18 and each of the connecting portions 20 and 22. The entire sensing coil 12 lies on the surface of a figure of revolution 14 corresponding to that obtained by the imaginary rotation of one of the primary magnetic field lines around the primary coil axis.

If the conditions are ideal, no flux would be linked with the secondary coil. In other words, each element of length of the secondary sensing coil 12 is cut by a certain number of magnetic field lines running along the figure of revolution 14 and would have induced in it an e.m.f. A field line which induces a voltage in a first portion of circle 18 in the direction shown by the arrow would also induce a voltage of equal magnitude in circle 16 in the direction shown by the arrow. Following both arrows around a single complete turn it becomes evident that the two equal voltages are in opposite directions and cancel each other out. Thus the integration of the total e.m.f.s around the secondary sensing coil 12 would lead to a net induced voltage in each turn of zero under free space conditions. It is therefore evident that the secondary sensing coils would have minimum coupling to the primary coil 10 but yet would have relatively strong coupling to the eddy current field of a metallic target at any forward angle of incidence. Alternate arrangements and shapes for the placement of the sensing coil on the flux tube 14 are shown in FIGS. 2, 3, and 4.

Figure 2:
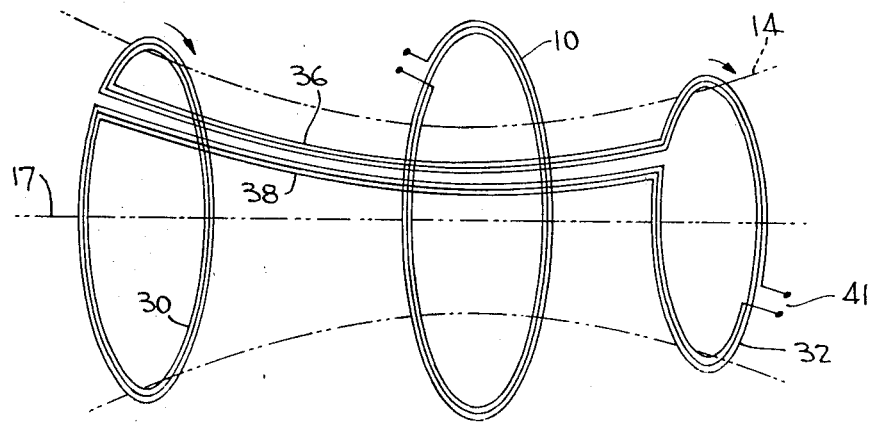
FIG. 2 is a perspective view of a second embodiment of the invention.

In FIG. 2 the flux tube 14 is shown extending on both sides of the primary coil 10. The secondary sensing coil 12 is placed on both sides of the primary coil 10 and forms circles 30 and 32 connected by cross connectors 36 and 38. Again the sensing coils would be cut at some point 41 and attached to a circuit for detecting the signals produced therein.

Figure 3:
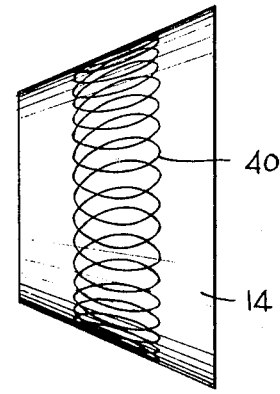
FIG. 3 is a front view of a third embodiment of the invention.

In FIG. 3 the figure of revolution 14 has placed thereon a secondary coil which is a progressive winding 40 which consists of a large number of approximately circular turns, each turn being shifted in azimuth with respect to it predecessor. The result is that each turn of the progressive winding is slightly shifted with respect to its preceding turn so that the series of turns, each having approximately the same diameter, produces a continuous progressive winding. The winding is open at one point so it can be connected to a detecting circuit. In this type of configuration a single winding may cover the entire circumference of the figure of revolution 14 or it may be divided into two or more separate windings. No matter what the number of windings used, the results will still be the same.

Figure 4:
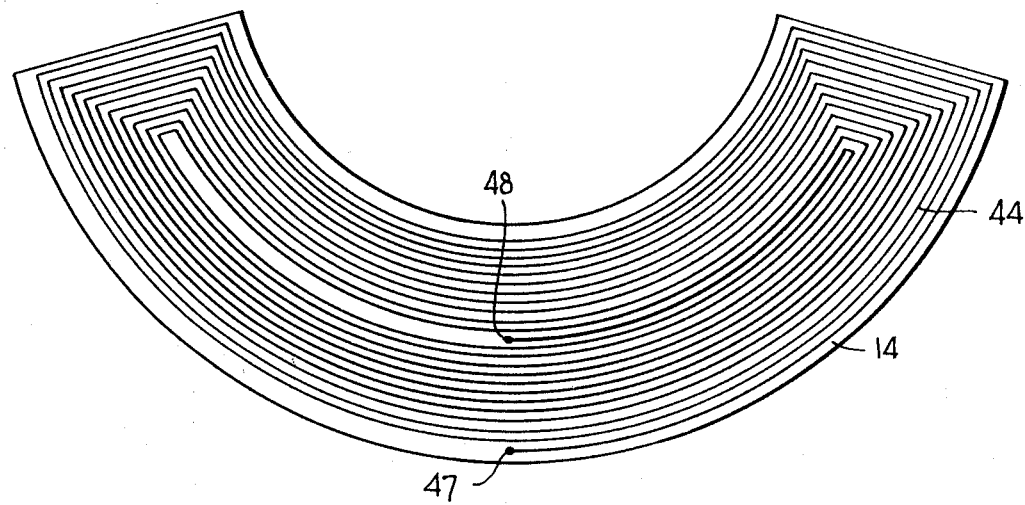
FIG. 4 is a front view of the sensing coil in a fourth embodiment of the invention.

In FIG. 4 the figure of revolution 14 has a secondary coil 44 that is in the form of a pancake winding. In this configuration the coil 44 has an increasing radius and the inner and outer ends of the coil can be attached to the detecting circuit by means of terminals 47 and 48. The coil as shown in FIG. 4 is made by a conventional etched or printed circuit technique. Utilizing printed circuits in place of multiturn wires avoids many of the production problems associated with wires. Additionally, printed circuits have the unique advantage of having a small mass and being able to withstand shock and vibration which might cause ordinary thin wires to break.

A typical printed circuit coil arrangement for use in this invention might have 20 mil wide conducting strips spaced apart at 20 mil intervals and etched on a 5—10 mil thick substrate. The substrate is fastened to the supporting figure of revolution by suitable adhesive. Alternatively, the surface of the figure of revolution may itself be etched with the desired coil arrangement.

While ideally the supporting structure for the sensing coil should have a surface corresponding to that obtained by the imaginary rotation of one of the primary field lines about the central axis of the primary coil, a good approximation may be obtained by using a cone-shaped supporting structure.

The primary coil may take on shapes other than circular as shown in FIGS. 1 and 2. The shape might be that of a polygon or a rectangle. Depending on the shape selected for the primary coil the sensing coil arrangement would have to be modified accordingly. These modifications would all be well within the skill of the art.

Figure 5:
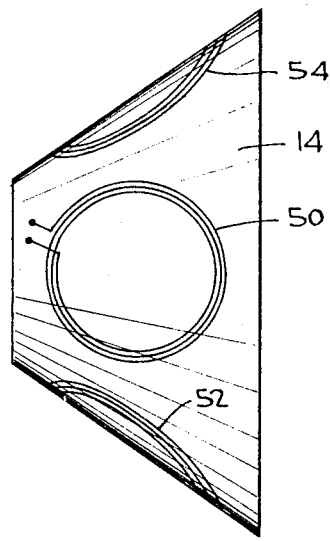
FIG. 5 is a front view of the sensing coil in a fifth embodiment of the invention.

In order to provide for directionality of the sensor a number of sensing coils may be symmetrically located around the figure of revolution as shown in FIG. 5. Sensing coils 50, 52 and 54 are three of the four coils which are placed around supporting cone 14. An arrangement of this type permits not only the location of metal in the proximity of the sensing coils but also a determination of the direction of the maximum signal relative to the location of the coils. After amplification and rectification, the outputs from diametrically opposite coils can be connected to the horizontal and vertical deflection plates of a small cathode-ray tube. With the amplification of the metal detector adjusted to compensate for the unequal horizontal and vertical deflection sensitivity of the cathode-ray tube, the beam from the tube will be deflected in the direction of the maximum signal. When the signals from the four coils are equal, the cathode-ray tube beam will be centered. However, where the signal from one of the coils is greater than the signal produced by the other coils, due to the fact that the metal to be located is at an angle off the axis and therefore closer to one of the coils than to its opposite partner, the cathode-ray beam will be deflected and indicate the direction of the maximum signal and hence the direction off the primary coil axis of the located metal.

It should be noted that the flux tube surface of the primary coil in free space would be modified if a metal plate, such as might be part of the housing holding the coils, is near the primary. However, if such a plate is normal to the coil axis, the effects of the eddy currents in this plate on the flux tube contour can be computed and accounted for without affecting construction and layout of the secondary sensing coils.

It will be apparent that the embodiments shown are only exemplary and that various modifications can be made in construction and arrangement within the scope of the invention as defined in the appended claims.

I claim:

1. A metal detector comprising:
   a. a primary coil having a central axis;
   b. means for applying alternating current to said primary coil to establish a magnetic field having filed lines;
   c. a surface of a figure of revolution coaxial with said central axis and corresponding to the surface described by the imaginary rotation of one of said field lines about said central axis;
   d. a sensing coil comprising a plurality of turns disposed on said surface such that each field line which induces a voltage in a first portion of one of said turns also induces a voltage of equal magnitude and opposite direction in a second portion of the same turn, whereby the integration of induced voltages around said sensing coil equals zero under free space conditions; and
   e. means for detecting voltage in said sensing coil.

2. The detector of claim 1 wherein said entire sensing coil is located one side of said primary coil.

3. The detector of claim 1 wherein said sensing coil extends to both sides of said primary coil.

4. The detector of claim 1 wherein said sensing coil comprises an etched or printed circuit.

5. The detector of claim 1 wherein said sensing coil comprises a progressive winding around said surface, each turn being shifted in position with respect to its preceding turn.

6. The detector of claim 1 further comprising at least two sensing coils to provide for directional sensing.

7. The detector of claim 6 wherein each of said sensing coils comprises an etched or printed circuit.

PO-1050
(5/69)

UNITED STATES PATENT OFFICE
CERTIFICATE OF CORRECTION

Patent No. 3,588,687　　　　　　　　　　Dated June 28, 1971

Inventor(s) Hans W. Kohler

It is certified that error appears in the above-identified patent and that said Letters Patent are hereby corrected as shown below:

Column 1, line 12, "with" is changed to --without--.

Signed and sealed this 11th day of January 1972.

(SEAL)
Attest:

EDWARD M. FLETCHER, JR.　　　　　　　　ROBERT GOTTSCHALK
Attesting Officer　　　　　　　　　　　　Acting Commissioner of Patents